TRIMMER BLADE TOOTH CONFIGURATION
Filed April 19, 1968
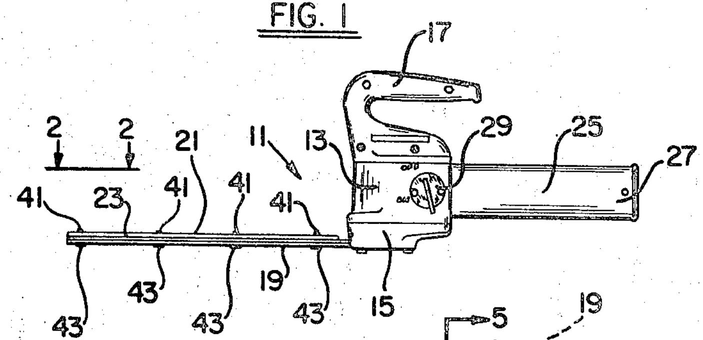
FIG. 3
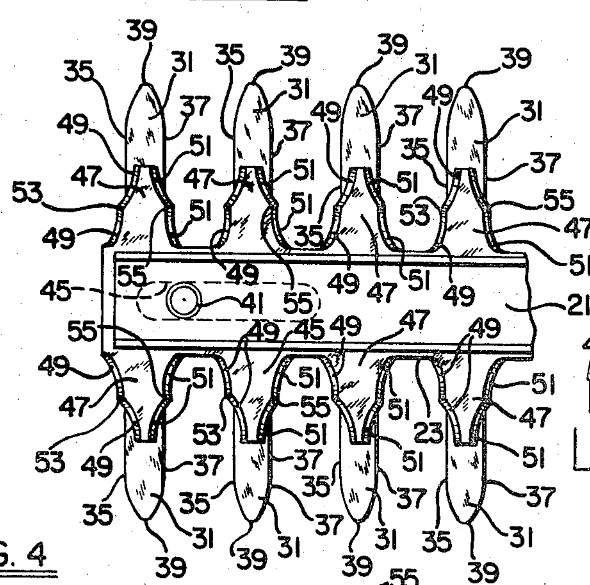
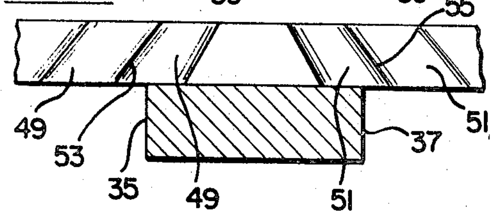
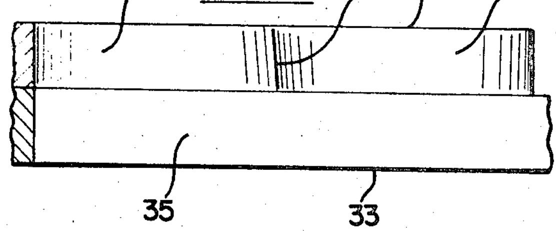
*INVENTOR*
KENNETH R. WELLS
BY Joseph R. Slotnik
*ATTORNEY*

United States Patent Office 3,564,714 Patented Feb. 23, 1971

1

3,564,714

TRIMMER BLADE TOOTH CONFIGURATION

Kenneth R. Wells, Joppa, Md., assignor to The Black and Decker Manufacturing Company, Towson, Md., a corporation of Maryland Filed Apr. 19, 1968, Ser. No. 722,625
Int. Cl. B26b *19/02*
U.S. Cl. 30—223 2 Claims

ABSTRACT OF THE DISCLOSURE

The device disclosed herein is a portable, power operated tool for trimming hedges, shrubs and the like and includes a housing adapted to have an electric motor supported therein. Power for the motor is supplied by a source such as a battery supported on the housing, and a handle on the housing facilitates easy manipulation and control. A stationary, double-edged, toothed comb is fixed to the housing and the motor is adapted to reciprocate a double edged, toothed blade disposed in overlaying relation with the comb. The teeth of the blade have a novel configuration calculated to enhance cutting efficiency and improve feeding characteristics while minimizing power requirements of the motor and/or power source.

SUMMARY OF THE INVENTION

The invention deals specifically with an improved configuration for the teeth of a reciprocating blade in a power operated hedge trimmer or the like. This blade overlays and reciprocates relative to a toothed, stationary comb and the blade tooth configuration is such as to provide maximum cutting efficiency, i.e. a clean cut of the material within the blade cutting path with minimum required cutting force. This construction is advantageous in all power operated trimmers, but is particularly so in those employing a battery power source since the size of battery required and its life is a function of the load generated during cutting.

Main objects, therefore, of the present invention are to provide an improved blade tooth configuration for a reciprocating, toothed blade of a power operated trimmer device or the like, which configuration facilitates optimum cutting ease and effectiveness and, in general, overall cutting efficiency, and which thereby minimizes the requirements as to power source capacity.

Further important objects of the present invention are to provide an improved trimmer blade tooth configuration of the above character which facilitates easy maintenance, i.e. sharpening, is relatively inexpensive to manufacture, durable in construction and reliable in use.

Other objects and advantages of the present invention will become more apparent from a consideration of the detailed description to follow taken in conjunction with the drawings annexed hereto.

BRIEF DESCRIPTION OF THE DRAWINGS

FIG. 1 is a side elevational view illustrating a portable, power operated trimmer with which the present invention finds particular use;

FIG. 2 is an enlarged, plan view of a portion of FIG. 1 as defined by the line 2—2 thereof;

FIG. 3 is an enlarged view of one set of cooperating teeth on the blade and comb illustrated in FIG. 2;

FIG. 4 is a sectional view of FIG. 3 taken along the line 4—4 thereof; and

FIG. 5 is a sectional view of a portion of FIG. 4 taken along the line 5—5 thereof.

2

BROAD STATEMENT OF THE INVENTION

Broadly described, the present invention relates to a portable, power operated trimmer comprising, in combination, an elongated stationary comb having a plurality of generally parallel teeth extending transversely thereof, said comb teeth each having generally oppositely facing straight, generally parallel edges, an elongated blade adapted to reciprocate relative to said comb and having a plurality of cutting teeth correlated with the teeth on said comb and extending transversely of said blade, said blade teeth each having generally oppositely facing cutting edges which generally converge toward their outer tips, each of said cutting edges being beveled and scalloped and defining a pair of outwardly facing, generally concave portions separated by a one relatively sharp point.

DETAILED DESCRIPTION

Referring now more specifically to the drawings, a hedge trimmer embodying the present invention is illustrated generally at 11 in FIG. 1 and is seen to include a motor housing 13 and gear case 15 with a handle 17 secured thereto. A blade assembly extends forwardly from the gear case 15 and includes an interconnected stationary comb 19 and blade cover plate 21 fixed to the gear case 15 and having a movable blade 23 sandwiched therebetween. Power for this tool is derived from a battery (not shown) formed as a slide-out powerpack adapted to fit in a rear handle portion 25 on the motor housing 13 and is accessible by means of an end cover 27; however, it is to be understood that the tool 11 may be powered from a conventional A.-C. source in which case the battery case 25 may be replaced by a suitably smaller handle and a line cord added. In any event, a suitable switch 29, here shown to be of the key-operated, safety variety, is provided on the motor housing 13 to provide a convenient on-off control for the tool 11.

Turning now to FIG. 2, the comb 19 is seen to comprise an elongated member having serially arranged, rows of teeth 31 extending generally transverse to the comb length and to either side thereof. The teeth 31 are seen to be substantially identical and include a pair of straight, generally parallel sides 35, 37 and an outer, somewhat rounded tip 39. Each of the teeth 31 is spaced from an adjacent tooth to easily accommodate the normal size shrub and hedge growth while not being spaced apart so far as to present a safety hazard.

The movable blade 23 overlays the stationary comb 19 and is sandwiched between the comb 19 and the cover plate 21 which is secured to the comb 19 by a plurality of bolts 41 and nuts 43. The cover plate 21 is maintained in spaced relation to the comb 19 by spacers (not shown) through which the bolts 41 extend. The bolts 41 and the spacers (not shown) extend through elongated openings 45 in the movable blade 23 to accommodate reciprocation of this blade 23 as well as to assist in guiding it. The blade 23 extends into the gear case and is connected to a suitable reciprocating slide mechanism therein (not shown) so that the blade 23 is caused to reciprocate.

Like the comb 19, the movable blade has serially arranged, rows of teeth 47 extending generally transverse to the blade length and to either side thereof. Each of the teeth 47 has a correlated tooth 31 on the comb 19 but reciprocates over a distance equal to about the tooth pitch so that each tooth 47 cooperates with a pair of comb teeth 31 during reciprocation.

Each of the teeth 47 has a pair of cutting edges defined by outwardly and generally oppositely facing concave edges or scallops 49, 51 spaced apart by outwardly protruding, sharp points 53, 55. Preferably, but not necessarily, there are two such scallops or concave edges and one protruding point on either side of each tooth 47 and these edges 49, 51 and points 53, 55 are sharpened to a fine edge as best shown in FIGS. 2–4.

In use, the movable blade 23 is caused to reciprocate longitudinally relative to the stationary comb 19 over a distance approximately equal to the tooth pitch. The scalloped edges 49, 51 of each tooth 47 cooperates in shear with the edges 37, 35, respectively, of two of the comb teeth 33 to cut the shoots or branches of shrubs, hedges, trees, etc. between the comb teeth 31 and therefore trim the shrub or hedge growth.

The scalloped or concave edges 49, 51 and separating points 53, 55 on the teeth 47 and the cooperable straight edges 35, 37 on the stationary comb teeth 33 have been found particularly advantageous in shrub and hedge trimming for the reason that the tooth points 53, 55 and the immediately adjacent portions of the concave edges 49, 51 penetrate and sever the shoots and branches with relative ease when compared with other tooth edge configurations. In addition, it will be noted that the edges 49, 51 of the movable blade teeth 47 converge generally toward the outer tip of each tooth 47 while the edges 35, 37 of comb blades 33 are generally parallel to further facilitate a progressive shearing of these shrub and hedge shoots as distinguished from an abrupt cutting as would occur were the edges 49, 51 generally parallel and not constructed as shown. All in all, the result is to maximize the cutting ease and efficiency of the device and minimize the loading on the motor and on the batter in the case of a cordless trimmer. This, in turn, increases the life of the device and minimizes part failure.

By the foregoing, there has been disclosed an improved shrub and hedge trimmer tooth configuration calculated to fulfill the inventive objects hereinabove set forth, and while a preferred embodiment of the present invention has been illustrated and described in detail, various additions, substitutions, modifications and omissions may be made thereto without departing from the spirit of the invention as encompassed by the appended claims.

I claim:

1. A portable, power operated trimmer comprising, in combination, an elongated stationary comb having a plurality of generally parallel teeth extending transversely thereof, said comb teeth each having generally oppositely facing straight, generally parallel edges, an elongated blade adapted to reciprocate relative to said comb and having a plurality of cutting teeth correlated with the teeth on said comb and extending transversely of said blade, said blade teeth each having generally oppositely facing cutting edges which generally converge toward their outer tips, each of said cutting edges being beveled and scalloped and defining a pair of outwardly facing, generally concave portions separated by a relatively sharp point.

2. A construction as defined in claim 1 wherein said comb and said blade each has a pair of rows of teeth extending generally transverse to the length of said comb and said blade and to either side thereof, respectively.

References Cited

UNITED STATES PATENTS

| | | | |
|---|---|---|---|
| 1,025,641 | 5/1912 | Pearl | 30—197 |
| 2,558,459 | 6/1951 | Podner | 30—220 |
| 2,964,845 | 12/1960 | Dooling | 30—216 |
| 3,161,954 | 12/1964 | Riley | 30—224 |
| 1,152,531 | 9/1915 | Marshall | 30—223X |

LESTER M. SWINGLE, Primary Examiner

J. C. PETERS, Assistant Examiner